US007063428B2

United States Patent
Lowe

(10) Patent No.: US 7,063,428 B2
(45) Date of Patent: Jun. 20, 2006

(54) REMOVABLE LIGHTBANK EXTENSION

(75) Inventor: Gregory Lowe, Berthoud, CO (US)

(73) Assignee: Chimera Company, Boulder, CO (US)

( * ) Notice: Subject to any disclaimer, the term of this patent is extended or adjusted under 35 U.S.C. 154(b) by 181 days.

(21) Appl. No.: 10/696,191

(22) Filed: Oct. 28, 2003

(65) Prior Publication Data

US 2005/0088836 A1 Apr. 28, 2005

(51) Int. Cl.
*G03B 15/02* (2006.01)

(52) U.S. Cl. .................. 362/18; 362/102; 362/278; 362/320; 362/352; 362/450; 135/19.5; 135/25.1; 135/98; 135/125; 135/139

(58) Field of Classification Search ........... 362/16–18, 362/352, 359–360, 450, 3, 102, 227–228, 362/319–320; 135/19.5, 25.1, 98, 125, 139
See application file for complete search history.

(56) References Cited

U.S. PATENT DOCUMENTS

| 3,851,164 | A | * | 11/1974 | Intrator ......................... 362/7 |
| 3,873,821 | A | * | 3/1975 | Larson ......................... 362/3 |
| 4,524,405 | A | * | 6/1985 | Heard ......................... 362/18 |
| 4,633,374 | A | * | 12/1986 | Waltz et al. .................. 362/17 |
| 5,023,757 | A | * | 6/1991 | Shirilla ....................... 362/16 |
| 6,491,405 | B1 | * | 12/2002 | Shirilla ....................... 362/16 |

* cited by examiner

*Primary Examiner*—Alan Cariaso
*Assistant Examiner*—Jason Han
(74) *Attorney, Agent, or Firm*—Cochran Freund & Young LLC; James R. Young

(57) ABSTRACT

A photography lightbank is extendable axially and radially to a larger size by an extension ring, which is removably attachable to the distal (front) end of the lightbank shroud. Extension rod connectors are configured for attachment of extension rods, which support the extension ring in outstretched configuration, to the distal ends of the primary support rods that support the lightbank shroud, while releasable fasteners attach the proximal end of the extension ring to the distal end of the shroud.

11 Claims, 9 Drawing Sheets

REMOVABLE LIGHTBANK EXTENSION

BACKGROUND OF THE INVENTION

1. Field of the Invention

The present invention is related to lightbanks for illuminating photographic objects, and more specifically to a removable extension that enlarges the lightbank.

2. State of the Prior Art

Lightbanks are used by photographers to create whatever lighting environment they need to illuminate photographic objects for the effects they want their photographs to portray. Conventional lightbanks, usually comprise a light source, a shroud to confine and direct the light produced by the light source, a diffuser panel to scatter and distribute the light evenly to reduce glare spots and dark spots, and a support structure. They are available in various sizes ranging from less than a foot to twenty feet or more across. Most professional photographers find that they need at least several different sizes and that they would like to have more. However, lightbanks are fairly expensive, and they are bulky and not easy to carry and set up, especially the medium and larger sizes. Consequently, many photographers are discouraged about purchasing and having all the lightbank size and shape variety they want or need at their photographic studios. Also, even if they have a variety of sizes and shapes available, some photographers are still discouraged about transporting more than one or two of them to off-site locations.

SUMMARY OF THE INVENTION

An object of the invention, therefore, is to provide a more versatile lightbank that can be converted from one size to another.

Another object of the invention is to provide several lightbank sizes with only moderate additional cost and bulk.

To achieve the foregoing and other objects of the invention, a shroud extension is detachably connectable to the distal end of a lightbank shroud to effectively enlarge the shroud axially and/or radially. The extension can include a fabric ring with a plurality of extension or extendable support rods, which are sized and shaped to match and attach to and/or extend from the distal end of the lightbank shroud.

BRIEF DESCRIPTION OF THE DRAWINGS

The accompanying drawings, which are incorporated in and form a part of the specification, illustrate the preferred embodiments of the present invention, and together with the written description and claims, serve to explain the principles of the invention. In the drawings:

DETAILED DESCRIPTION OF THE PREFERRED EMBODIMENTS

Figure 1:
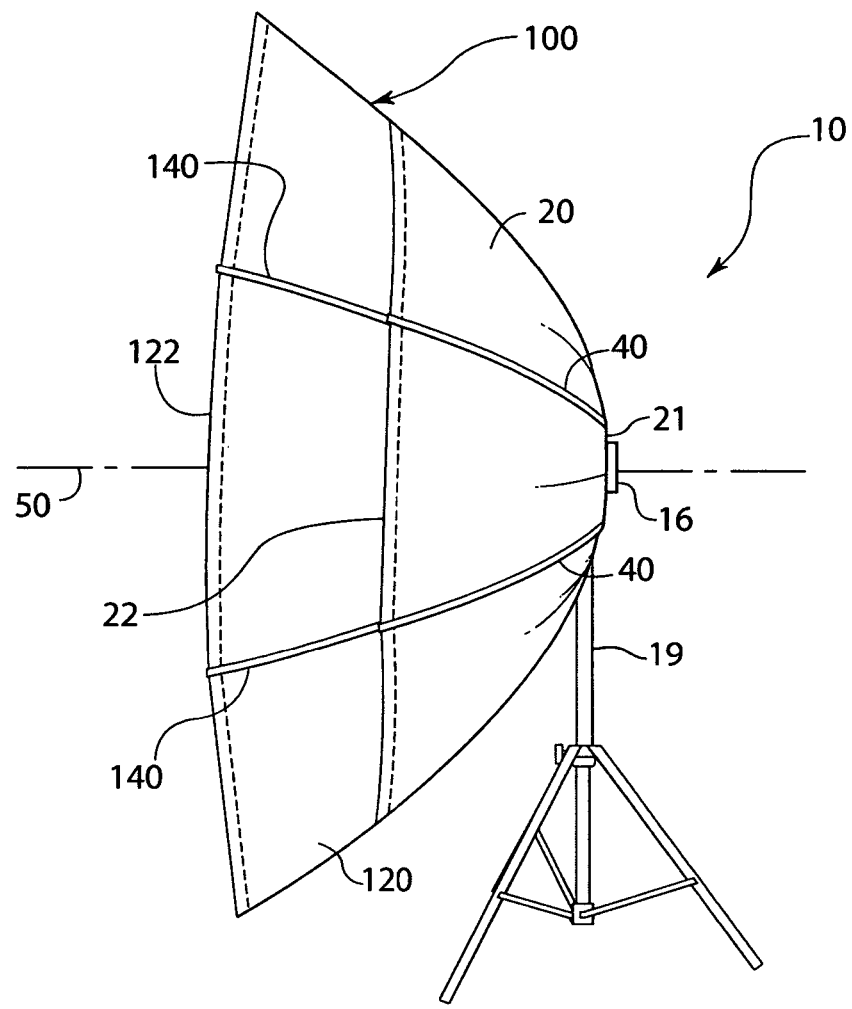
FIG. 1 is a side elevation view of a shroud extension attached to, and protruding axially and radially from the distal end of the primary shroud of a lightbank assembly to enlarge the lightbank according to this invention.
Figure 2:
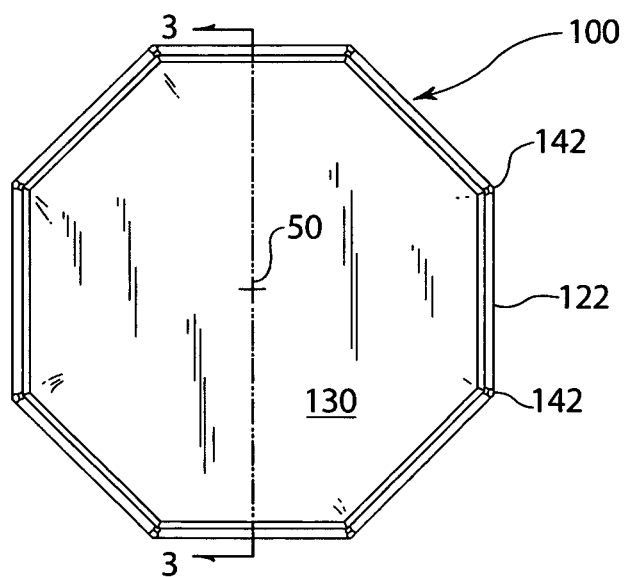
FIG. 2 is a front end elevation view of the shroud extension of FIG. 1.
Figure 3:
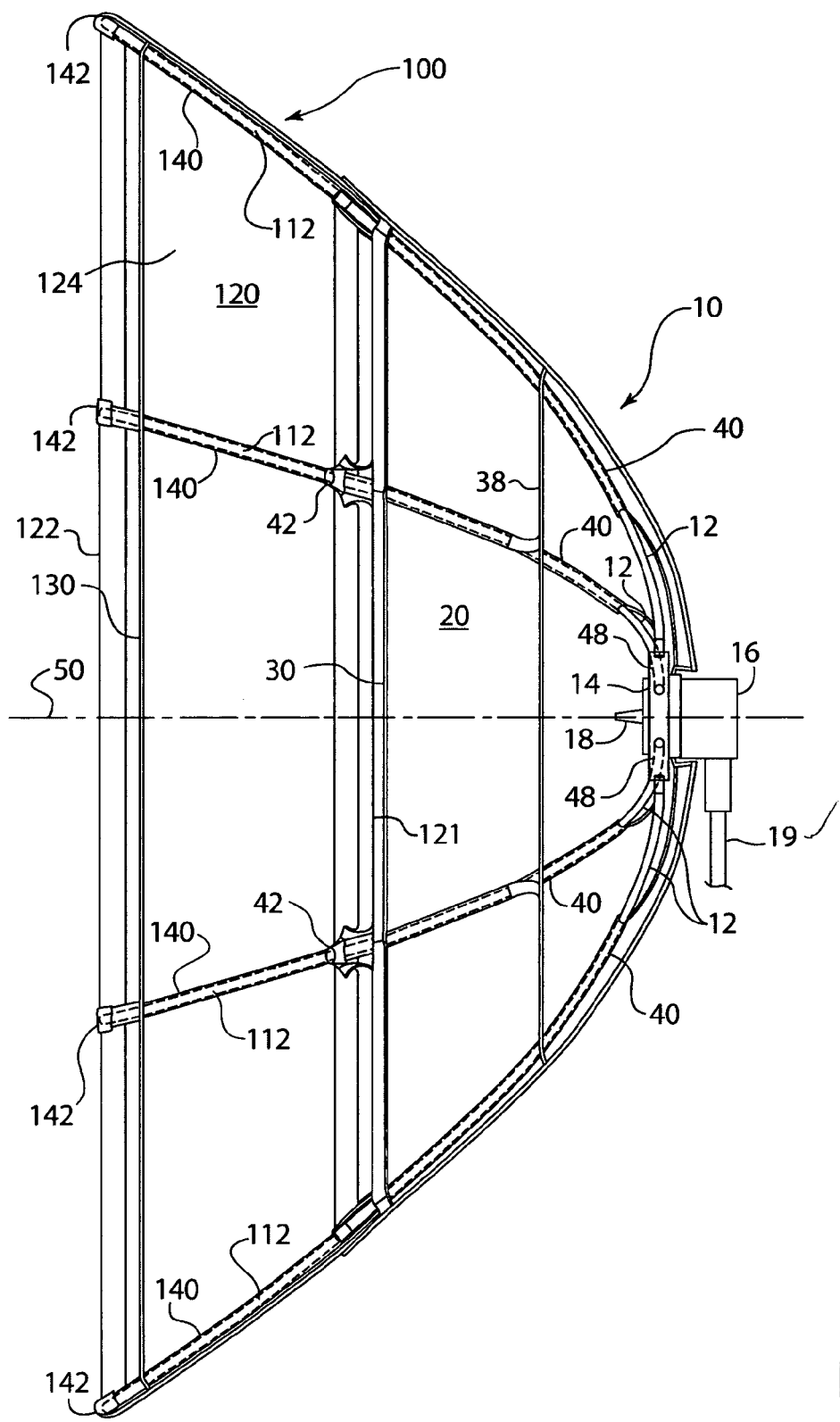
FIG. 3 is an enlarged cross-sectional view of the extension shroud attached to the distal (front) end of the primary shroud taken substantially along section line 3—3 of FIG. 2.
Figure 4:
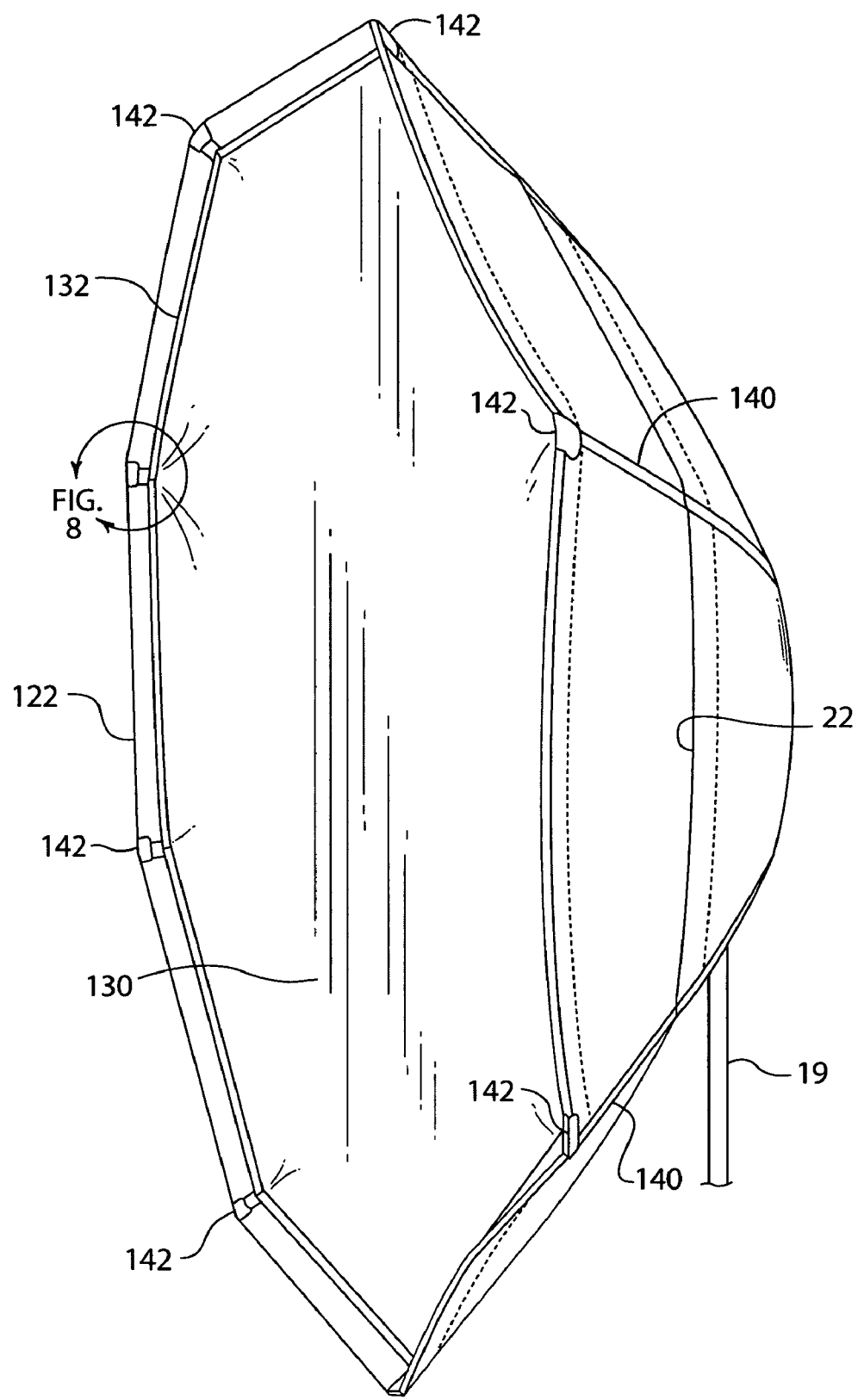
FIG. 4 is a perspective view of the shroud extension mounted on the primary shroud of a lightbank assembly according to this invention.
Figure 7:
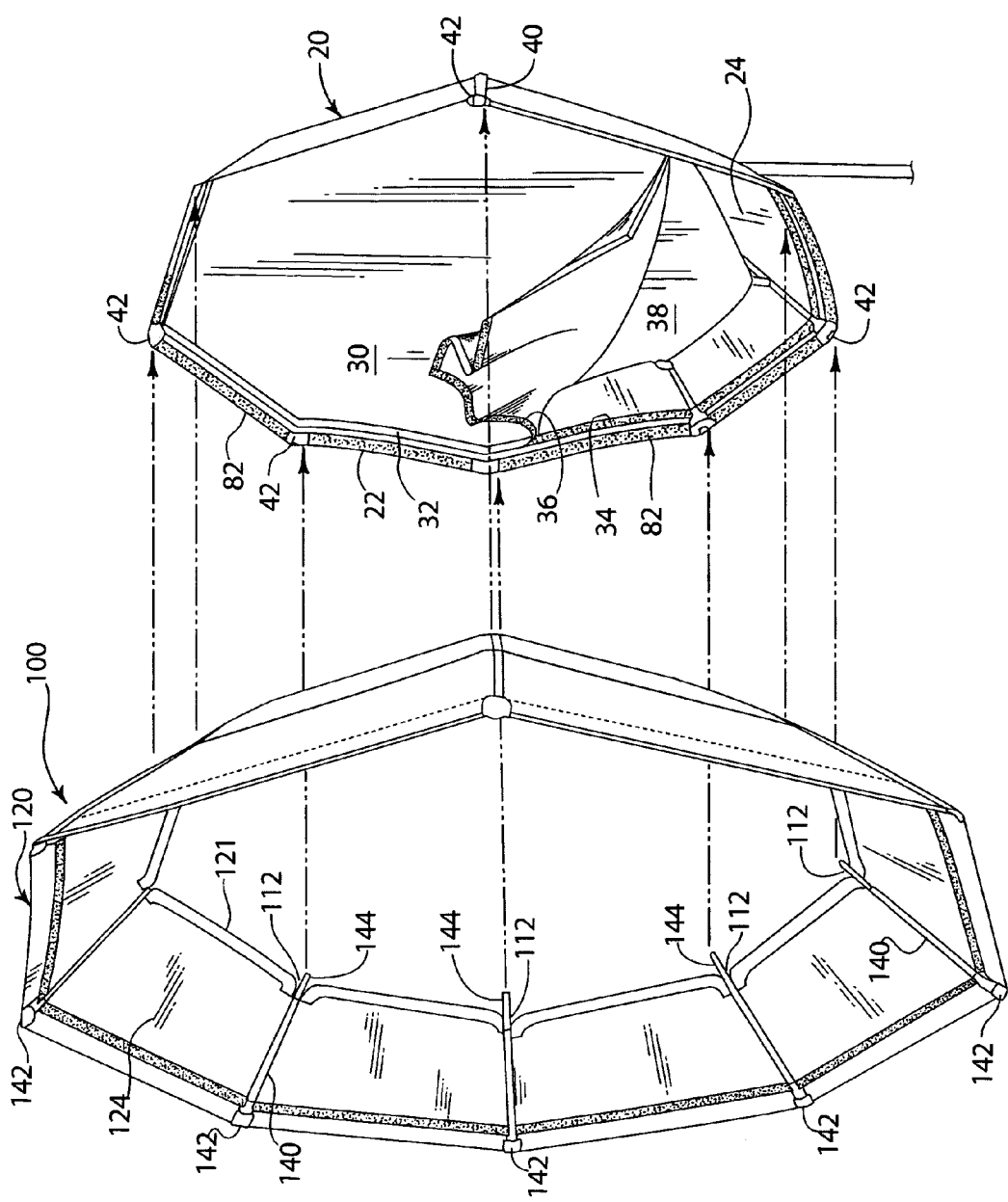
FIG. 7 is a perspective view similar to FIGS. 4–6, but with the extension shroud detached from the primary shroud.
Figure 8:
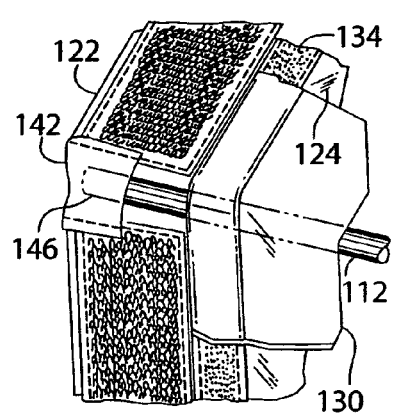
FIG. 8 is an enlarged view of an example terminal abutment of the distal end of an extension rod in the extension fabric ring at the location indicated in FIG. 4.

A shroud extension 100 is shown in FIGS. 1 and 4 mounted on the distal (front) end 22 of the primary shroud 20 of a conventional lightbank assembly 10 to enlarge the lightbank assembly 10 axially and radially according to this invention. As best seen in FIGS. 1, 3, and 7, a typical conventional lightbank assembly 10 comprises an extendable and collapsible shroud 20, which is often made of opaque fabric, plastic, or other opaque material that does not allow light to escape, and which is supported in its outstretched, use configuration by a plurality of resilient support rods 12 anchored in some kind of frame 14. For special applications or special lighting effects, the shroud 20 fabric or other material could be translucent to allow some light to escape, but usually the shroud 20 is opaque.

The frame 14 of a conventional lightbank 10 is often either part of, or mounted around, a housing 16, which contains a light source 18. The housing 16 can be supported in myriad ways, but it is often supported by a tripod stand 19. The support rods 12 keep the fabric shroud 20 outstretched to extend axially and radially from the frame to confine light produced by the light source and direct it forwardly in a generally axial direction to a space, object, or background, which a photographer wants to illuminate. The number of support rods 12 is optional, but, usually, a larger shroud 20 requires either a larger number of support rods 12, or the support rods 12 should be stronger, or both. A larger number of rods 12 will provide a different polygonal shape for the distal (front) end 22 of the shroud 20. In the example illustrated in FIGS. 1–7, eight support rods 12 are used, which provides an octagonal shape. Four support rods 12 would provide a square shape, for example, and six support rods 12 would provide a hexagonal shape.

A flexible diffuser panel 30 (best seen in FIG. 7), which is usually made of a white, translucent material that scatters light, has a peripheral edge 32 that is sized and shaped to conform to the size and shape of the primary shroud 20 adjacent its distal (front) border 22. Therefore, it is attached around its peripheral edge 32 to the inside surface 24 of the primary shroud 20 to extend substantially perpendicular to the longitudinal axis 50 of the lightbank 10 across the front of the primary shroud 20 adjacent the distal border 22 of the primary shroud 20. The diffuser panel 30 can be attached around its peripheral edge 32 to the primary shroud 20 in any convenient manner. The diffuser panel 30 in the example illustrated in FIG. 7 is attached by mating hook and loop fastener strips 34, 36, such as Velcro™ hook and loop fastener strips, although snaps, zippers, tie cords, buttons, rivets, thread, tape, or any of a number of other fastener instrumentalities could also be used. As is also shown in FIG. 7, an optional additional diffuser panel 38 is also sometimes used inside the primary shroud 20 to ensure an even more uniform scattering and distribution of light without glare, brighter, or darker zones.

The primary shroud support rods 12 typically extend through sleeves 40 sewn into the fabric of the primary shroud 20, as perhaps best seen in FIG. 3, although the support rods 12 could be retained in position by looped straps (not shown) or other means. In smaller lightbanks, it may not be necessary to use any retainers for the support rods 12. It is usually desirable, though, to provide some form of abutment structure 42 (FIG. 7) at the distal end 22 of the shroud 20 for abutment by the distal ends 46 of the support rods 12, so that, when the proximal ends 48 of the support rods 12 are mounted to the frame 14, the support rods 12 are placed in compression to bend or deform in a resilient manner to the outstretched shape or configuration of the shroud 20 in a manner similar to an unfolded, extended umbrella. In some lightbanks 10, the support rods 12 are straight and deformed by compression into the outstretched shape of the shroud 20, and, in others, the support rods 12 are pre-formed or bent into the desired shape.

As shown in FIGS. 1–7, the typical shape of the outstretched primary shroud 20 extends from its proximal end 21 adjacent the housing 16 in a somewhat parabolic shape to its distal end or border 22 to form a longitudinal axis 50. For purposes of this description, the longitudinal axis 50 extends generally through the center of the light source 18 (FIG. 3) and through the center point of the polygonal figure formed by the distal end 22 of the outstretched fabric shroud 20. Therefore, the shroud 20 is described as extending generally axially and radially outward from the housing 16, which means in the direction of the longitudinal axis 50 as well as in radially away from the longitudinal axis 50, as shown in FIGS. 1–7. The front end of the lightbank 10 is synonymous with the area circumscribed by the distal border 22 around the longitudinal axis 50, so the back end is generally the housing 16 and frame 14 end of the lightbank 10.

The shroud extension 100, shown in FIGS. 1–7, comprises an extension ring 120 of flexible fabric or other material with a proximal end border 121 that, when outstretched, is sized and shaped to match and attached to the distal border 22 of the primary shroud 20. From its proximal border 121, the ring 120 flares axially and radially outward in relation to the longitudinal axis 50 to an extension distal border 122, which is larger than the primary distal border 22. Therefore, when the shroud extension 100 is attached to the primary shroud 20, as shown in FIGS. 1–7, the effective size of the lightbank 10 is enlarged both axially and radially to create a different lighting effect than the lightbank 10 with the primary shroud 20 alone. The extension ring 120 is preferably made with an opaque fabric or other material similar to the primary shroud 20, but, for special lighting requirements, it can be made with a translucent material, as explained above for the primary shroud 20.

The structure of the shroud extension 100 can also be similar in many respects to the structure of the primary shroud 20. For example, the plurality of extension rods 112 (shown in phantom lines in FIG. 3 and the proximal ends 144 of which are shown in FIG. 7) can be slideably positioned into sleeves 140 formed and sewn into the extension ring 120 and abutted against distal end abutment structures 142, as shown in FIGS. 1–8. Connection of the proximal ends 144 of the extension rods 112 to the distal ends 46 of the primary support rods 12 will be described in more detail below. An extension diffuser panel 130 can be provided in the front end of the shroud extension 100, if desired. However, the primary diffuser panel 30 is attached to the primary shroud 20 in a manner that does not interfere with attachment of the shroud extension 100 to the distal end border 22 of the primary shroud 20, so the primary diffuser panel 30 can remain in place to scatter, soften, and evenly distribute light when the shroud extension 100 is attached in place for use. Consequently, use of either the extension diffuser panel 130 and/or the primary diffuser panel 20 is optional, as is use of the additional diffuser panel 38 in the primary shroud 20. However, for most photographic lighting applications, the extension diffuser panel will probably be used whenever the shroud extension 100 is used.

Figure 5:
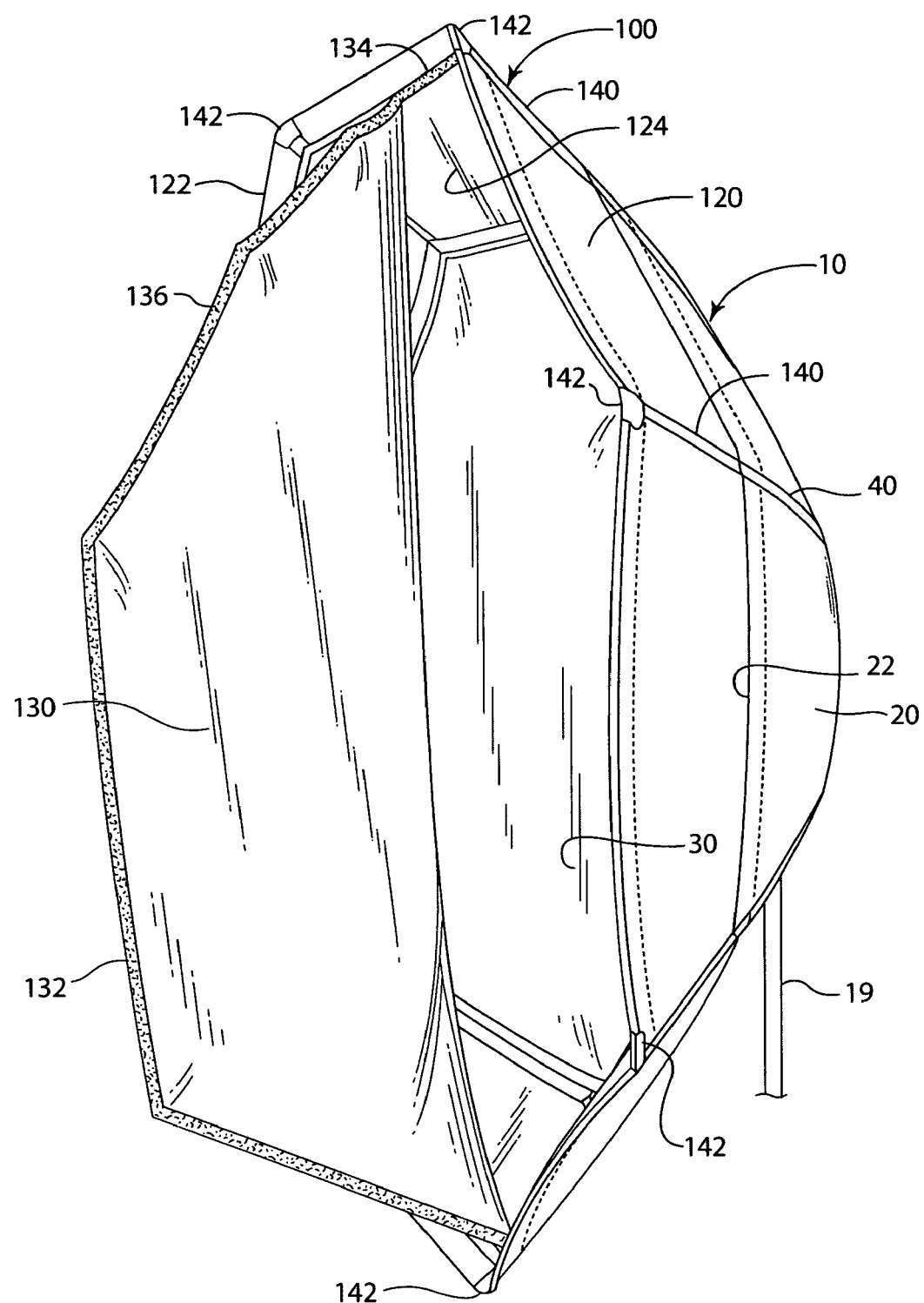
FIG. 5 is a perspective view similar to FIG. 4, but with the extension diffuser panel partially detached to reveal portions of the interior of the shroud extension and of the primary diffuser panel attached in its proper place in the primary shroud.

The extension diffuser panel 130 has a peripheral edge 132 that preferably matches in size and shape to the inside surface 124 of the extension ring 120 adjacent the distal end border 122 of the extension ring 120. Therefore, the extension diffuser panel 130 can be attached to the inside surface 124 of the extension ring 120 by any convenient detachable fastener or attachment instrumentality, such as the hook and loop fastener strips (Velcro) 134, 136 around the inside surface 124 adjacent the distal edge border 122 and around the peripheral edge 132, respectively, as best seen in FIG. 5. Of course, as mentioned above, other attachment instrumentalities, such as snaps, buttons, cords, threads, rivets, zippers, glue, tape, and others, could be used in place of, or in addition to, the hook and loop fastener strips 134, 136. Also, the fasteners can be inverted so that the extension ring 120 attaches to the external surface of the primary shroud 20, if desired. In any event, it is preferred that there be an overlap of the distal end border 22 over the proximal end border 121 or vice versa to help prevent light leakage through the seam where the extension ring 120 attaches to the primary shroud 20.

As mentioned above, the proximal ends 144 of the extension rods 112 can be detachably connected to the distal ends 46 of the primary support rods 12 in any convenient manner that will enable the extension rods 112 to support the extension ring 120 in its outstretched, use configuration, which configuration is shown in FIGS. 1–6. Therefore, it is preferred, although not essential, that the rod connection structure be one that enables the extension rods 112 to be put under some compression between the primary rods 12 and the abutment structures 142, if desired, to make the extension rods 112 conform to and support the full outstretched shape of the extension ring 120.

An example detachable extension rod connector 60 that can provide this kind of function, as well as the function of keeping the primary support rods 12 in compression, as described above, is illustrated in FIGS. 9–11. Essentially, the connector 60 in this example includes a ferrule portion 61 with an axial hole 62 in one end, which is fitted onto the distal end 46 of the primary support rod 12. As also illustrated in FIGS. 10 and 11, the rod connector 60 has a stub shaft portion 64 extending axially away from the distal end 46 of the primary support rod 12. The stub shaft portion 64 of the connector 60 is smaller in diameter than the ferrule portion 61, so there is an annular shoulder 66 on the connector 60. The abutment structure 42 of the primary shroud 20 includes a grommet 70 with a hole 72 diameter that is large enough to fit over the stub shaft portion 64 of the connector 60, but which is too small to fit over the ferrule portion 61. Therefore, the shoulder 66 of the connector abuts the grommet 70 of the abutment structure 42 (FIGS. 10 and 11) to limit axial movement of the primary support rod 12 in relation to the primary shroud 20, thereby enabling the primary support rod 12 to be maintained in compression when the proximal end 44 of the primary support rod 12 is anchored to the frame 14 (FIG. 3).

Figure 9:
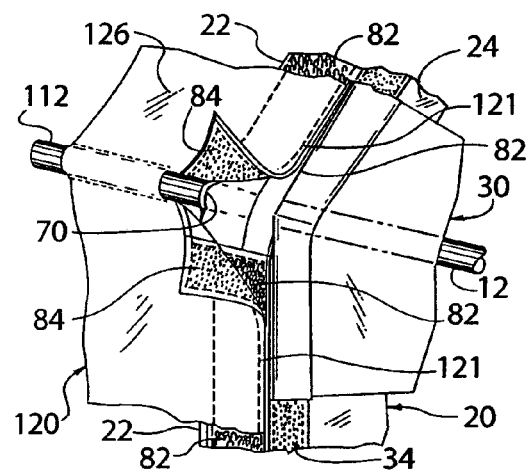
FIG. 9 is an enlarged view of an extension rod and immediately surrounding portions of the fabric extension ring attached to adjacent portions of the primary shroud and primary shroud support rod in the location indicated in FIG. 6.
Figure 10:
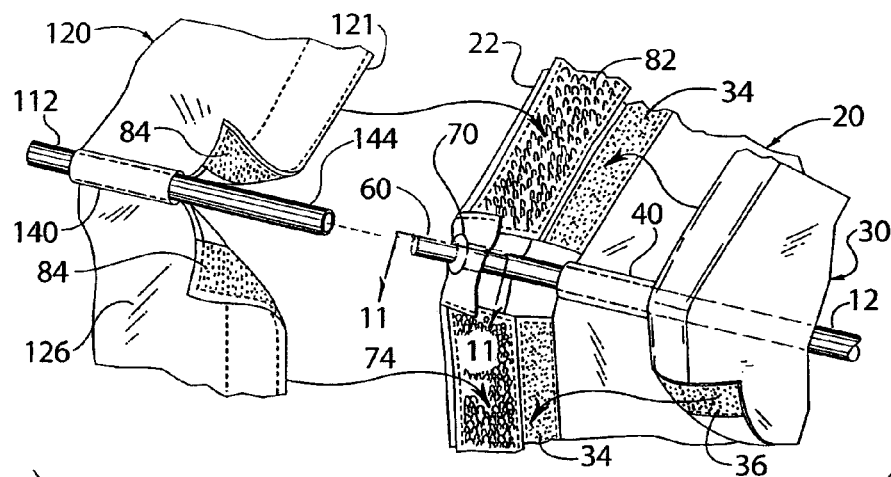
FIG. 10 is a view similar to FIG. 9, but with the extension rod and extension fabric ring detached from the primary shroud and primary shroud support rod.
Figure 11:
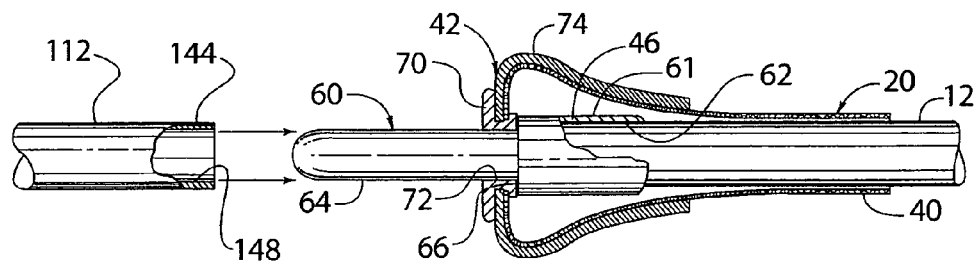
FIG. 11 is an enlarged view of an example terminal abutment of a distal end of a primary shroud support rod in the distal end of the primary shroud that also accommodates detachable connection of the extension rod to the primary shroud support rod.

Then, as illustrated in FIGS. 9–11, the proximal end 144 of the extension rod 112 can have a hole 148 with an inside diameter that is large enough to receive and slide over the stub shaft portion 64 of the connector 60 to connect the extension rod 112 to the primary support rod 12. The proximal end 144 of the extension rod 112 can then abut the grommet 70 to limit axial movement of the extension rod 112 in relation to the primary support rod 12 and thereby, if desired, maintain the extension rod 112 under some compression between the grommet 70 (FIGS. 9–11) and the abutment structure 142 (FIG. 8) on the shroud extension 100. If a grommet 70 is not used, the proximal end 144 of the extension rod 112 can abut directly on the annular shoulder 66 of the connector 60 for much the same effect.

Figure 12:
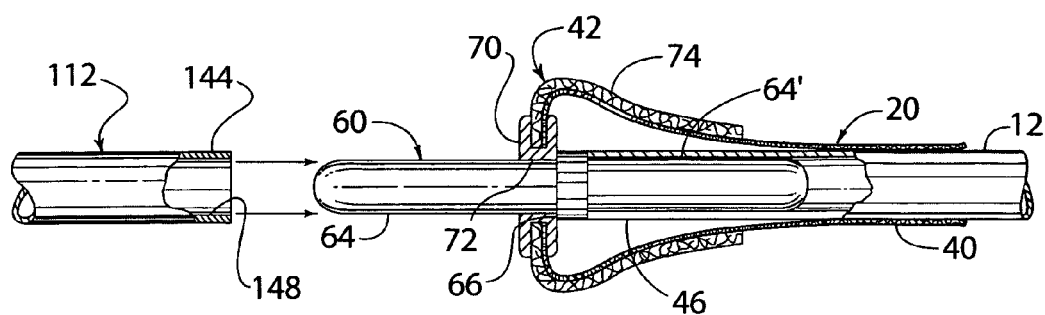
FIG. 12 is an illustration similar to FIG. 11, but of another example connection of the extension rod connection to the primary shroud support rod.
Figure 13:
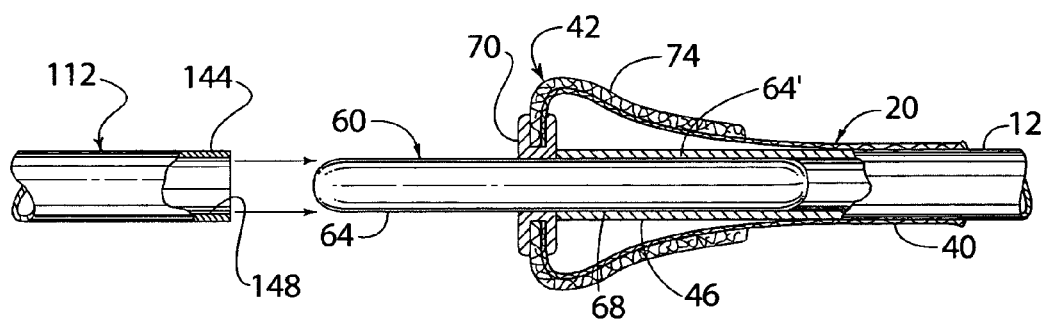
FIG. 13 is another example variation of a connection of the extension rod to the primary shroud support rod.
Figure 14:
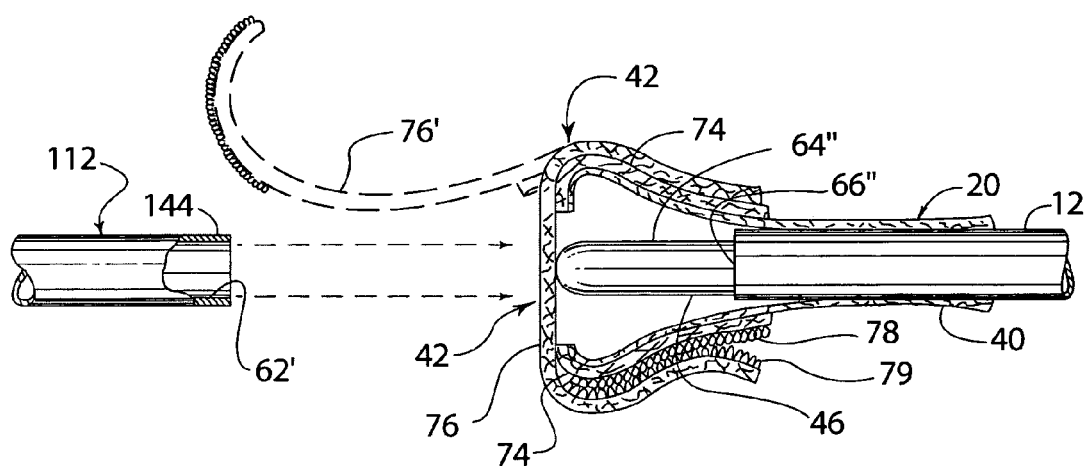
FIG. 14 is an illustration of another example abutment that can be used at the distal end of the primary shroud support rod, which can be opened as shown in phantom lines to accommodate connection of the extension rod to the primary support rod.

Of course, the connector 60 could also be structured inversely, for example, the connector 60 shown in FIG. 12 has two oppositely directed stub shafts 64, 64' for sliding into hollow ends 46, 144, respectively of the rods 12, 112. A shoulder 66 between the two stub shafts 64, 64' can abut the grommet 70 for the same effect as that described above for the connector 60. As another alternative, either the distal end 46 of the primary support rod 12 or the proximal end 144 of the extension support rod 112 can be machined or otherwise made with a smaller diameter stub shaft 64", as illustrated in FIG. 14, while the opposite proximal end 142 or distal end 46 is hollow with a hole 62' large enough to receive the stub shaft 64". The grommet 70, if there is one, can abut either the shoulder 66' created by the smaller diameter portion 64" of the rod 12 or 112, or the shoulder 66" created by the wall thickness of the rod 112 or 12 around the hole 62'. In another example connector 60, illustrated in FIG. 13, the connector 60 comprises a dowel pin 68 extending into, and axially away from, the hollow distal end 144 of the primary support rod 12. The portion 64' of the dowel pin 68 that extends into the distal end 46 of the primary support rod 12 can be held in place by any common technique, such as glue, friction, crimping, etc., which are well within the knowledge and capabilities of persons skilled in the art. The external portion 64 is sized to fit through the hole 72 in grommet 70 and into the hole 148 in the proximal end 144 of the extension rod 112 to connect the extension rod 112 to the primary support rod 12 in the same manner as described above. In this example, the grommet 70 abuts the distal end 46 of the primary support rod 12. Persons skilled in the art will be able to devise many other connector structures for the rods 12, 112 to provide some or all of the functions described above to implement and practice this invention, once they understand the principles of this invention.

The abutment structure 42 of the primary shroud 20 can include the grommet 70 affixed to a piece of reinforcing fabric 74 or other material sewn, glued, or otherwise attached to the shroud 20 fabric or other material, for example, as illustrated in FIGS. 10–13. Alternatively, as illustrated in FIG. 14, the abutment structure 42 can include a flexible strap or flap 76 sewn or otherwise attached to one part of the reinforcing fabric 74 and detachably connected to another part of the reinforcing fabric 74 by a fastener, for example, the hook and loop type fastener strip 78, 79. When the extension rod 112 is not attached to the primary support rod 12, the flap 76 can be closed and fastened to the reinforcing fabric 74 by the fasteners 78, 79, so the distal end 46 of primary support rod 12 abuts the flap 76. Then, in order to connect the extension rod 112 to the primary support rod 12, the flap 76 can be detached from the reinforcing fabric 74 and moved aside, as illustrated by the phantom lines 76'. The extension rod 112 can then be moved into place for connection to the primary support rod 12 in any manner, as described above.

Figure 15:
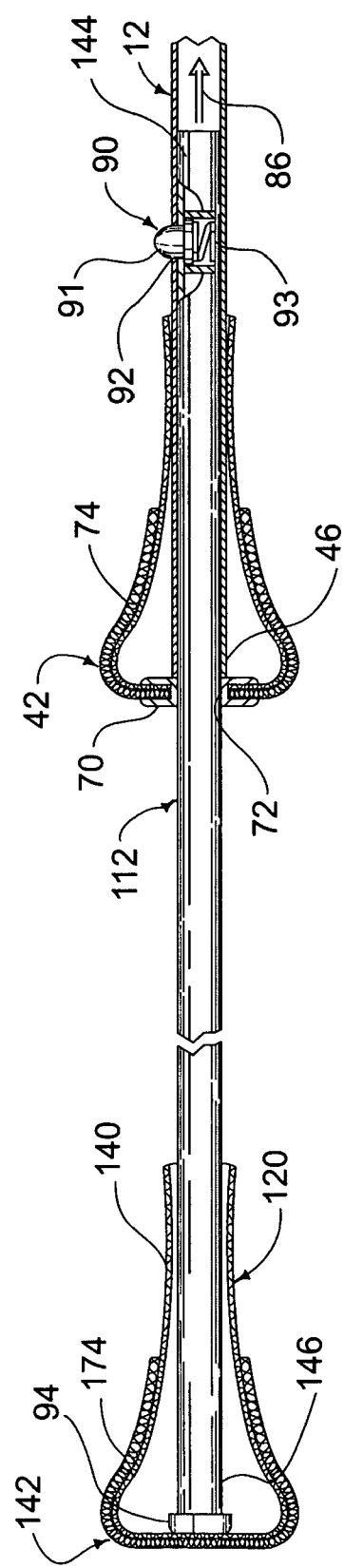
FIG. 15 is an illustration, partly in cross-section, of an example telescoping primary shroud support rod with an extension rod, which is slideable telescopically into and out of the primary shroud support rod.

Instead of separate extension rods 112, as shown and described in the examples above, the extension rods 112 can be telescoped into and out of the primary support rod 12, an example of which is illustrated in FIG. 15. In this example, the extension rod 112 slides, as indicated by arrow 86 into the primary support rod 12 for storage, when the extension shroud 100 (FIGS. 1–7) is not attached to the primary shroud 20. However, for support of the fabric ring 120, when the extension shroud 100 is attached to the primary shroud 20, the extension rods 112 can be pulled telescopically out of the primary support rods 12 and extended through the sleeves 140 of the extension shroud 100 and into the extension rod abutment 142, as illustrated in FIG. 15. The extension rod 112 can be retained in this extended position by any suitable latch or other device, many of which are well-known, for example, the spring-biased button latch 90 shown in FIG. 15. In this example, the button latch 90 comprises a push button 91 mounted in the extension rod 112 near its proximal end 144. The push button 91 is biased by spring 93 to protrude radially from the extension rod 112. Normally, when the extension rod 112 is retracted into rod 12, the sidewall of rod 12 prevents such radial protrusion. However, when the extension rod 112 is extended to a point where the push button aligns with a side hole 92 in the primary rod 12, the spring 93 causes the push button 91 to protrude radially through the hole 92, where it prevents any further relative sliding movement between the extension rod 112 and the primary support rod 12. Of course, to retract the extension rod 112, the push button 91 can be pushed manually against the bias of spring 93 back inside rod 12 to again permit slideable movement of the extension rod 112 in relation to primary support rod 12. The knob 94 at the distal end 146 of the extension rod 112 can be used to prevent the extension rod 112 from being retracted too far inside the primary support rod 12. The grommet 70 of the primary abutment structure 42 abuts the distal end 46 of the primary support rod 12 in the same manner as described above. The extension abutment structure 142 can be a piece of reinforcing fabric 174 fastened to the extension ring 120 to form a pocket to receive and retain the distal end 146 of the extension rod 112 in the same manner as shown in FIGS. 1–7 or any other suitable manner to support the distal (front) end 122 of the extension ring 120 against the extension rod 112.

Figure 6:
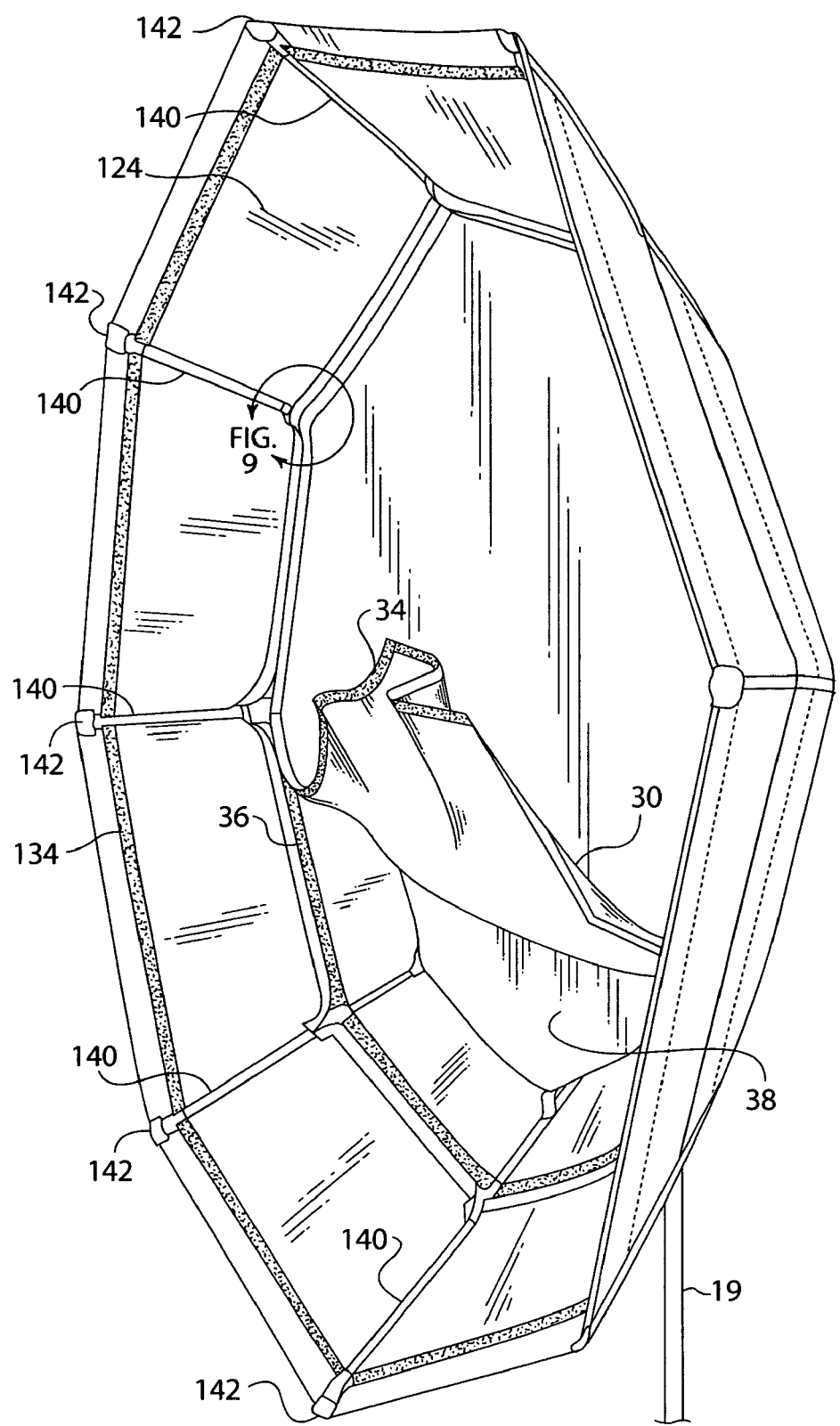
FIG. 6 is a perspective view similar to FIGS. 4 and 5, but with the extension shroud completely removed and the primary diffuser panel partially detached from the primary shroud.

The proximal end border 121 of the extension ring 120 is preferably detachably connected to the distal end border 22 of the primary shroud 20, both to add structural support for the shroud extension 100 and to prevent leakage of light through the seams where the primary shroud 20 meets the extension ring 120. While there are many attachment instrumentalities, such as snaps, buttons, zippers, cords, and others that can be used for these purposes, hook and loop type fastener strips 82, 84, such as Velcro™, are preferred and shown in FIGS. 7 and 9 as well as indicated in FIGS. 3, 5, and 6 in which one or both of the hook and loop strips 82, 84 are hidden by an overlaying flap or border piece. Therefore, with reference primarily to FIGS. 7 and 9, and secondary reference to FIGS. 3, 5, and 6, strips 82 of one type (hook or loop) of the fastener material are positioned preferably, but not essentially, on the inside surface 24 of the primary shroud 20 adjacent the distal end border 22. Strips 84 of the other, mating type (hook or loop) of the fastener material are positioned preferably, but not essentially, on the outside surface 126 of the extension ring 120 adjacent the extension proximal border 121. Therefore, when the mating fastener strips 82, 84 are fastened together, outside surface 126 of the extension ring 120 adjacent the extension proximal border 121 is detachably connected substantially around its periphery to the inside surface 24 of the primary shroud 20 adjacent the primary distal border 22. Again, the fastener strip 82 is between the primary distal border 22 and the fastener strip 34 for the primary diffuser panel 30, so attachment of the primary diffuser panel 30 to the primary shroud 20 does not interfere with attachment of the extension ring 120 to the primary shroud 20 and vice versa.

The foregoing description is considered as illustrative of the principles of the invention. Furthermore, since numerous modifications and changes will readily occur to those skilled in the art, it is not desired to limit the invention to the exact construction and process shown and described above. Accordingly, resort may be made to all suitable modifications and equivalents that fall within the scope of the invention. The words "comprise," "comprises," "comprising," "include," "including," and "includes" when used in this specification are intended to specify the presence of stated features, integers, components, or steps, but they do not preclude the presence or addition of one or more other features, integers, components, steps, or groups thereof.

The embodiments of the invention in which an exclusive property or privilege is claimed are defined as follows:

1. In lightbank apparatus, which includes a collapsible primary shroud mounted on, and extending outwardly from, a frame, wherein the primary shroud is supported in axially and radially extended configuration by a plurality of primary shroud support rods, which are connected at respective proximal ends to the frame and extend along the primary shroud to respective distal ends at a primary distal border of the primary shroud; an improvement comprising:

an attachable and detachable shroud extension, which includes: (i) a ring of flexible material having an extension proximal border, which conforms in size and shape to the primary distal border of the primary shroud, and an extension distal border at a distance spaced axially outward from the extension proximal border, said extension distal border being larger in circumference than the extension proximal border; (ii) a plurality of extension rods positioned in circumferentially spaced relation to each other around the shroud extension such that each of said extension rods extends from a proximal end at the extension proximal border to a distal end at the extension distal border; (iii) extension rod connectors, which are configured to connect the proximal ends of the extension rods axially to the distal ends of the primary shroud support rods in a detachable manner; and (iv) mating border connectors on the extension proximal border and the primary distal border which are configured to connect the extension proximal border to the primary distal border in a detachable manner;

whereupon the primary shroud is usable alone for a lightbank of a primary size, but, with the shroud extension attached is also useable alternatively for a lightbank that is larger axially and radially than the primary size.

2. The improvement of claim 1, including an extension light diffuser sheet, which has a peripheral edge that matches in size and shape to the extension distal border when the shroud extension is mounted on and extending axially from the primary shroud, said extension light diffuser sheet including connectors around the peripheral edge configured to detachably connect the extension light diffuser sheet to the shroud extension adjacent the distal border.

3. The improvement of claim 2, wherein the connectors around the peripheral edge of the extension light diffuser include hook and loop fastener components that releasably connect to mating hook and loop fastener components on the shroud extension adjacent the extension distal border.

4. The improvement of claim 1, wherein the extension rod connectors include a ferrule on the distal end of each primary shroud support rod and a protruding end that is sized and shaped to receive and retain the proximal end of one of the extension rods.

5. The improvement of claim 4, wherein the proximal end of the extension rod has an axial hole, and wherein the protruding end of the extension rod connector has a shaft that is sized and shaped to fit slideably, but snugly, in the axial hole in the proximal end of the extension rod.

6. The improvement of claim 5, wherein the ferrule has an axial hole, and wherein the distal end of the support rod is sized and shaped to fit slideably, but snugly, in the axial hole in the ferrule.

7. The improvement of claim 4, wherein the ferrule on the distal end of each primary shroud support rod has an annular shoulder extending radially outward in relation to the protruding end, and wherein there are a plurality of grommets in the primary shroud adjacent the distal border of the primary shroud, said grommets each having an inner diameter that is large enough to accommodate passage of the protruding end of the ferrule through the grommet but small enough so that the annular shoulder of the ferrule is not passable through the grommet.

8. The improvement of claim 1, wherein the border connector includes hook and loop fastener components extending around the extension proximal border and around the primary distal border.

9. The improvement of claim 1, wherein the lightbank apparatus includes a primary light diffuser sheet with a peripheral edge that matches in size and shape to the primary distal border of the primary shroud, including mating connectors adjacent the peripheral edge of the primary light diffuser and adjacent the primary distal border configured to detachably connect the primary light diffuser to the primary shroud, and further wherein the mating connectors adjacent the primary distal end of the primary shroud that mate with and connect to the connectors adjacent the peripheral edge of the primary light diffuser are positioned adjacent, but axially inward in relation to the border connector on primary shroud that mates with the border connector on the extension proximal border, so that the primary light diffuser is attachable to the primary shroud without interfering with attachment of the shroud extension to the primary distal border of the primary shroud.

10. A method of enlarging a lightbank, which includes a collapsible primary shroud mounted on, and extending outwardly from, a frame, wherein the primary shroud is supported in axially and radially extended configuration by a plurality of primary shroud support rods, which are connected at respective proximal ends to the frame and extend along the primary shroud to respective distal ends at a primary distal border of the primary shroud, said method including:

exposing the distal ends of the primary shroud support rods;

connecting proximal ends of a plurality of extension rods, which support an extension ring, to the distal ends of the primary shroud support rods in a detachable manner; and attaching a proximal border of the extension ring in a detachable manner to the primary shroud adjacent the primary distal border.

11. The method of claim 10, including attaching a circumferential edge of an extension diffuser panel in a detachable manner to the extension ring adjacent a distal extension border of the extension ring so that the extension diffuser panel substantially encloses the distal end of the extension ring.

* * * * *